Aug. 6, 1946.  T. E. McFALL  2,405,318
PISTON RING SPACER
Filed Jan. 3, 1944

Inventor
Thurlow E. McFall
By Liverance and
Van Antwerp
Attorneys.

Patented Aug. 6, 1946

2,405,318

UNITED STATES PATENT OFFICE 2,405,318

PISTON RING SPACER

Thurlow E. McFall, Sparta, Mich.

Application January 3, 1944, Serial No. 516,827

9 Claims. (Cl. 309—44)

This invention relates to piston rings primarily used in internal combustion engines, and is more particularly concerned with a novel, practical and efficient spacer to be disposed between upper and lower thin steel side rails in rings for internal combustion engines, commonly known as oil rings.

It is a primary object and purpose of the present invention to provide an oil ring of the character specified which will have the side rails held against the upper and lower sides of the ring groove in which the ring is installed, and in which there is an exceptionally large venting of the spacer member between the side rails for the passage of oil scraped from the walls of the cylinder to be drained from the bottom of the piston ring groove to the interior of the piston.

It is a further object and purpose of the present invention to provide a novel construction of spacer for the side rails made from a single length of flat steel and which will provide an intermediate rail to bear against the cylinder wall spaced from the upper and lower side rails to greatly increase and facilitate the passage of oil through the ring and to present to the surface of the cylinder wall three scraping edges, two because of the side rails and one because of the intermediate spacer and to provide two routes of passage for the oil, one below the upper side rail and the other above the lower side rail with the spacer between forming the lower side of the upper oil passage and the upper side of the lower oil passage.

Such a construction of piston ring and spacer is readily and easily manufactured and is easy of installation in the ring groove without danger of breaking the intermediate spacing member which in many rings of the general character are of cast iron and, being relatively weak and thin in cross section, are particularly subject to breakage.

The invention for the attainment of the objects and purposes enumerated, as well as others which will hereinafter appear, may be understood from the following description taken in connection with the accompanying drawing, in which, Fig. 1 is a plan view of the intermediate spacer member of the ring in partly formed condition.

Like reference characters refer to like parts in the different figures of the drawing.

The completely assembled ring of my invention is adapted to be used with internal combustion engine pistons 1 in the oil groove or grooves of the piston, shown at 2, which has an oil drainage passage 3 leading from its bottom to the interior of the piston. The ring includes upper and lower thin steel side rails 4 of curved form parted at one side, the partings normally springing open when the rails are in free condition but with the partings closed when installed in a cylinder. Said side rails assuming a substantially circular form when installed and contracted within a cylinder. With such rings an expander 5 ordinarily is used located within the piston ring groove back of the ring.

Figure 1:
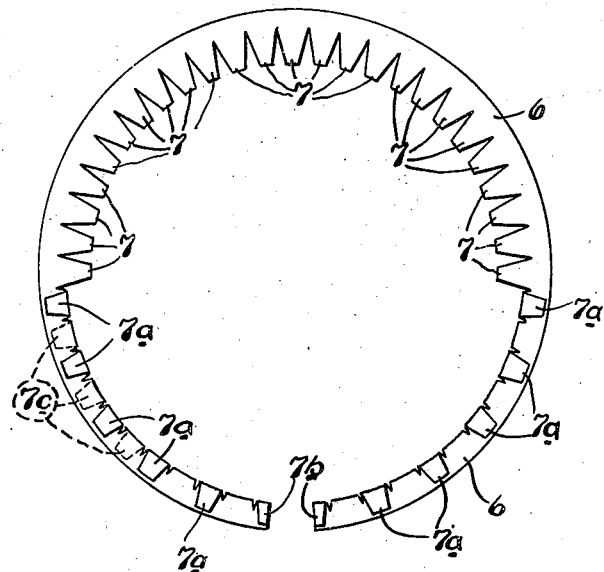
Figure 2:
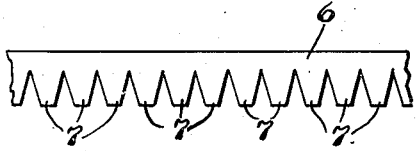
Fig. 2 is a fragmentary plan of the length of the flat steel material from which the spacer is made.
Figure 3:
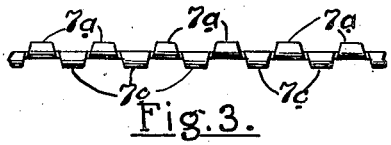
Fig. 3 is a fragmentary inner edge view of the spacer.
Figure 4:
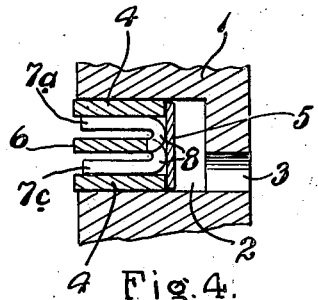
Fig. 4 is a fragmentary vertical section, somewhat enlarged, illustrating the installation of the complete ring in the oil groove of a piston.

With my invention the spacer is made from a single length of flat metal and may have the same thickness as the side rails which in common practice is approximately .025″ thick. The length of flat steel 6 is formed with a continuous succession of tongues 7 projecting from one side thereof with relatively deep V-shaped notches between (Fig. 2). Alternate tongues are bent in a U-turn to lie over the body of the strip, as indicated at 7a, and at the parting when the strip has been shaped into substantially circular form one of said tongues may be divided into two parts one at each side of the parting as indicated at 7b in Fig. 1. The other alternate tongues are similarly bent substantially parallel to the body of the strip 6 at the opposite or under side, as indicated at 7c. When thus bent the innermost points of the U-shaped bends at 8 of both series of tongues lie in the same vertical plane and when installed between the upper and lower side rails of the piston ring are engaged against by the expander 5, which expander also engages against the inner edges of the rails 4. The outer edge of the body 6 of the spacer lies in substantially the same vertical plane with the outer edges of the rail 4 as shown in Fig. 4.

Figure 5:
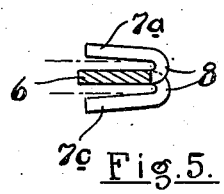
Fig. 5 is a transverse section through the spacer.
Figure 6:
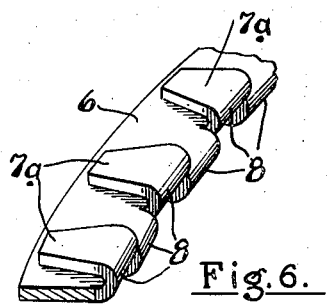
Fig. 6 is a fragmentary portion of the spacer ring member made in accordance with my invention.

As shown in Fig. 5 the upper tongues 7a and the lower tongues 7c may be bent to lie at a slightly acute angle to the body 6 of the spacer whereby when placed between the rails 4 in a piston ring groove the tongues will be flexed at their free ends slightly toward each other to lie in parallelism with the body 6 and exert a sufficient pressure against the rails 4 to hold them against the upper and lower sides of the piston ring groove 2.

With this structure oil scraped by the edges of the rails or of the intermediate portion 6 of the expander enters below the upper rail 4 or above the lower rail 4 between the spaced tongues 7a or 7c and may pass through suitable vent openings or notches in the expander 5 to be drained to the interior of the piston. The drainage passage for oil is large and wholly or partial closing of such drainage passage by carbon and the like in the operation of the engine is avoided. The outer edge of the part 6 of the spacer provides a bearing against the wall of the cylinder in addition to the bearings provided by the outer edges of the side rails 4.

This construction of ring and of the expander is simply and expeditiously produced and it is applied to and installed in a piston ring groove without danger of fracture. The ring is insured against any stoppage of oil passage through it and provides a particularly practical, novel and useful construction in connection with internal combustion engine oil rings.

The claims define the invention and are to be considered comprehensive of all forms of structure coming within their scope.

I claim:

1. A spacer for piston rings, adapted to be located between upper and lower side rails of a ring comprising, a single length of flat metal formed into substantially circular form and parted at one side, said spacer at its inner side of the body thereof having integral tongues extending therefrom return bent back upon the body of the spacer and toward its outer edge, said tongues being alternately located over and under the body of the spacer.

2. A construction containing the elements in combination defined in claim 1, said tongues being spaced short distances from the body of the spacer.

3. A construction containing the elements in combination defined in claim 1, said tongues being spaced short distances from the body of the spacer and normally extending outwardly at a slight acute angle thereto.

4. A piston ring comprising upper and lower thin rails of metal and a spacer between said rails formed from a single length of flat metal and formed into substantially circular form with a parting at one side, said spacer having integral tongues at its inner edges therearound alternately return bent over and under the body of the spacer from which the tongues extend, the upper tongues bearing against the under side of the upper steel rail and the lower tongues against the upper side of the lower steel rail.

5. In a piston ring, upper and lower spaced apart rails and a vented spacer between said rails comprising a single length of flat metal of substantially circular form with a parting at one side and having an outer body portion and tongues extending therefrom at its inner edges spaced from each other, said tongues being narrower at their free ends than where connected to the body portion of the spacer, and said tongues being alternately return bent back over and under the body of the spacer.

6. A construction containing the elements in combination defined in claim 5, the distance from the outer edge of the spacer body to the rearmost points of the bends of said tongues being substantially equal to the distance between the inner and outer edges of said rails.

7. A spacer for vented piston rings comprising, a single length of thin flat metal comprising, a body portion of substantially circular form parted at one side and integral tongues extending from said body portion and return bent partly over and underneath the body portion, the free ends of said tongues extending toward the outer edge of said body portion of the spacer, the adjacent sides of said tongues and of the body portion of the spacer being spaced short distances apart.

8. The structure havin the elements in combination defined in claim 7, the free ends of said tongues terminating a short distance from the outer edges of the body of the spacer.

9. A construction containing the elements in combination defined in claim 7, said tongues being of less width at their free ends than at their connection to the body of the spacer, and having sides converging toward each other toward the free ends thereof, and said tongues terminating short of the outer edges of the spacer and spaced at their sides a short distance from the adjacent sides of the body of the spacer.

THURLOW E. McFALL.